United States Patent [19]

Lalikos et al.

[11] 4,190,088
[45] Feb. 26, 1980

[54] CHAFE OR FIRE SLEEVE FOR HOSE

[75] Inventors: James M. Lalikos, Springfield; Chester T. Gazda, Chicopee; Lawrence O'Melia, Easthampton, all of Mass.

[73] Assignee: Titeflex Corporation, Springfield, Mass.

[21] Appl. No.: 884,612

[22] Filed: Mar. 8, 1978

[51] Int. Cl.² ............................................. F16L 11/10
[52] U.S. Cl. ..................................... 138/126; 138/127; 138/125; 138/145; 138/178; 428/36; 428/113; 428/377; 428/425.5; 428/447; 428/448; 428/920; 428/921
[58] Field of Search ................ 428/36, 425, 447, 448, 428/113, 377, 920, 921; 138/125, 145, 126, 127, 178; 285/149

[56] References Cited

U.S. PATENT DOCUMENTS

| 2,577,049 | 12/1951 | Uline | 138/127 |
| 3,411,981 | 11/1968 | Thomas | 138/141 |
| 3,561,493 | 2/1971 | Maillard | 138/137 |
| 3,913,625 | 10/1975 | Gazda | 138/127 |
| 3,916,488 | 11/1975 | Gazada | 24/262 R |

FOREIGN PATENT DOCUMENTS 2124680  12/1971  Fed. Rep. of Germany ............. 428/36

OTHER PUBLICATIONS

"Hose Handbook", RMA, pp. 8-14.

Primary Examiner—Ellis P. Robinson

[57] ABSTRACT

A chafe or fire sleeve for a hose is an integral coaxial structure having an inner layer of silicone and an outer layer of urethane in the range of 80%-20% urethane and 20%-80% silicone, respectively. The inner hose structure preferably comprises an elastomeric hose covered by braid, with the silicone bonded onto the braid.

16 Claims, 5 Drawing Figures

FIG. 2

COMPOSITION

| Material | Urethane<br>Silicone | 100%<br>0% | 70%<br>30% | 50%<br>50% | 35%<br>65% | 0%<br>100% |
|---|---|---|---|---|---|---|
| Urethane (Elastothane 640) | | 100 parts | 70 parts | 50 parts | 35 parts | |
| Silicone (GE SE 456) | | | 30 parts | 50 parts | 65 parts | 100 parts |
| Silica | | 10 parts | 7 parts | 5 parts | 3.5 parts | |
| Treated Clay | | 14 parts | 10 parts | 7 parts | 5 parts | |
| Silane | | 0.27 parts | 0.2 parts | 0.15 parts | 0.12 parts | |
| CoAgent | | | 1.5 parts | 1.5 parts | 1.5 parts | |
| Dessicant | | 3 parts | 3 parts | 3 parts | 3 parts | |
| Leveler | | 3 parts | 3 parts | 3 parts | 3 parts | |
| Plasticizer | | 2.5 parts | 2.5 parts | 2.5 parts | 2.5 parts | |
| Catalyst | | 2 parts | 1.85 parts | 1.8 parts | 1.77 parts | 1.8 parts |
| Pigment | | 4 parts | 4 parts | 4 parts | 4 parts | 4 parts |

Press Cure: 5 minutes at 350°F. for 100% to 50/50%.
10 minutes at 325°F. for 35/65% to 0/100%.

No Post cure required.

FIG. 3

PHYSICAL PROPERTIES

| Test Condition | 100% Urethane | | | 70:30 Urethane:Silicone | | | 50:50 Urethane:Silicone | | | 35:65 Urethane:Silicone | | | 100% Silicone | | |
|---|---|---|---|---|---|---|---|---|---|---|---|---|---|---|---|
| | U.T.S. | %E | Duro/wt.gain | U.T.S. | %E | Duro/wt.gain | U.T.S. | %E | Duro/wt.gain | U.T.S. | %E | Duro/wt.gain | U.T.S. | %E | Duro/wt.gain |
| Original Properties at Room Temp. | 1772 PSI | 167% | A75 | 1245 PSI | 155% | A70 | 1092 PSI | 177% | A68 | 1085 PSI | 210% | A68 | 1122 PSI | 600% | A57 |
| Aircraft Fuel Fluid Soak: | | | | | | | | | | | | | | | |
| 24 hr. JP-4 | 1681 PSI | 145% | A75/0.7% | 1192 PSI | 133% | A68/9.3% | 746 PSI | 108% | A61/26.1% | 684 PSI | 133% | A56/33.4% | 227 PSI | 120% | A37/99.4% |
| 24 hr. Mil-H-5606 | 1795 PSI | 150% | A74/0.6% | 1155 PSI | 140% | A69/5.7% | 872 PSI | 128% | A60/15.7% | 703 PSI | 132% | A60/20.3% | 274 PSI | 127% | A45/56.8% |
| 24 hr. Mil-F-7808 | 1745 PSI | 155% | A74/0.65% | 1286 PSI | 150% | A72/1.2% | 945 PSI | 142% | A67/3.6% | 992 PSI | 185% | A67/3.7% | 879 PSI | 550% | A54/7.4% |
| 24 hr. Skydrol 500A | 838 PSI | 103% | A70/14.9% | 840 PSI | 122% | A69/16.6% | 646 PSI | 127% | A65/16.9% | 800 PSI | 167% | A65/12.6% | 861 PSI | 537% | A51/5.1% |
| Heat Aged | | | | | | | | | | | | | | | |
| 168 hr. 250°F. | 1421 PSI | 127% | A78 | 1191 PSI | 135% | A73 | 1090 PSI | 153% | A70 | 1070 PSI | 175% | A70 | 920 PSI | 500% | A61 |
| 168 hr. 300°F. | 969 PSI | 57% | >A90 | 910 PSI | 118% | A76 | 829 PSI | 127% | A74 | 896 PSI | 150% | A75 | 1143 PSI | 562% | A64 |
| 168 hr. 350°F. | 1940 PSI | 0% | >A95 | 1257 PSI | 0% | >A95 | 807 PSI | 75% | A81 | 853 PSI | 122% | A81 | 1043 PSI | 517% | A63 |
| 168 hr. 400°F. | Deformed Specimen | | | Embrittled | | | 1253 PSI | 0% | >A95 | 762 PSI | 18% | >A95 | 976 PSI | 410% | A66 |

FLEX TEST

| Condition Temp. | 100% Urethane | | | 70:30 Urethane:Silicone | | | 50:50 Urethane:Silicone | | | 35:65 Urethane:Silicone | | | 100% Silicone | | |
|---|---|---|---|---|---|---|---|---|---|---|---|---|---|---|---|
| | 10 T | 3 T | 1 T | 10 T | 3 T | 1 T | 10 T | 3 T | 1 T | 10 T | 3 T | 1 T | 10 T | 3 T | 1 T |
| Room Temp. | Pass | Pass | Pass | Pass | Pass | Pass | Pass | Pass | Pass | Pass | Pass | Pass | Pass | Pass | Pass |
| 4 hr. -65°F. | 2 Pass 1 Fail | Fail | Fail | Pass | Pass | Fail | Pass | Pass | Fail | Pass | Pass | Pass | Pass | Pass | Pass |
| 168 hr. 250°F. | Pass | Pass | Pass | Pass | Pass | Pass | Pass | Pass | Pass | Pass | Pass | Pass | Pass | Pass | Pass |
| 168 hr. 300°F. | Pass | Pass | Pass | Pass | Pass | Pass | Pass | Pass | Pass | Pass | Pass | Pass | Pass | Pass | Pass |
| 168 hr. 350°F. | Pass | Pass | Fail | Pass | Pass | Fail | Pass | Pass | Fail | Pass | Pass | Pass | Pass | Pass | Pass |
| 168 hr. 400°F. | Not Suitable for Testing | | | Fail | Fail | Fail | Fail | Fail | Fail | Pass | Pass | Pass | Pass | Pass | Pass |

Abrasion: Not Determined | 8.17% wt. loss | Not Determined | Not Determined | Not Determined

CHAFE OR FIRE SLEEVE FOR HOSE

This invention relates to new and improved composite hoses with chafe or fire sleeves, and more particularly to hoses which are especially—although not exclusively—well adapted for use as a fuel line hose on a high performance aircraft, for example.

In the environment in which the inventive hose is used, its outer covering must do two things. First, it should resist chafing when mechanical abrasion occurs and second it must not deteriorate in the presence of fire to such an extent that it allows raw fuel within the hose to be fed to the flames. Therefore, it is equally plausible to refer to the outer covering as a "chafe or fire sleeve". For convenience, the specification will hereinafter use the expression "chafe sleeve" in a generic manner to cover both of these characteristics.

For hoses to be suitable for fuel line use on an aircraft, they must reliably retain their desirable characteristics over a wide range of hostile environmental conditions. For example, when one end of an aircraft fuel line hose is near a hot engine, it may encounter temperatures in the order of 400° F., or more. When the aircraft is flying at extremely high altitudes, the other parts of the same fuel line hose might encounter ambient temperatures such as −65° F. The hose may contain oil or hydrocarbon fuel, being pumped under extremely high pressure. Of course, there is no way of knowing whether any other chemical might be spilled come into contact with, or otherwise be deposited on the hose.

The movement and vibration of the aircraft during flight may cause the exterior of the hose to chafe against nearby aircraft body structural elements. If there should be a fire, the hose might be damaged or become deteriorated, nevertheless, it would also be expected to safely contain the fuel under pressure and to withstand extremely high temperatures without spilling the oil or fuel into the fire despite such damage. Thus, it is desirable to provide a fire and chafe sleeve, which is expected to provide a fire retardant barrier to protect the inner structure of the hose.

Chafe resistant materials which have these characteristics and which are able to provide these functions are found among the modern and more recent elastomerics. Among these modern elastomers are "Teflon", urethane, silicone, and combinations thereof. Regardless of which of these or other materials are used, it is desirable that they be extrudable. However, a use of these materials and of the techniques required to manufacture hoses from them presents a number of problems which are difficult to solve.

Most of the plastic materials presently used for chafe sleeves, such as PTFE, cause the hose to become stiff and thus restrict their bend radius. If the elastomeric jackets allow full flexibility, they tend to inhibit a widespread use of the hose because they impose narrow temperature limits or limited fluid compatibility.

If a urethane material is used as a chafe sleeve, it gives a good abrasion resistance, but it is considered unsuitable for temperatures above 250° F. and below −40° F. Silicone has poor abrasion resistance and is not practical for service with hydrocarbon fuel and oil.

Accordingly, an object of this invention is to provide a composition and a structure for use as a chafe sleeve protection on hoses, especially those which might be suitable for use on an aircraft.

Another object of the invention is to provide hoses which continue to give good and unimpaired service over at least the entire temperature range of −65° F. to 400° F.

Still another object of the invention is to provide chafe or fire sleeve which are abrasion resistant, can be used with oil, hydrochemical fuel, and other chemicals, and do not spill fluids during fires which are less than a total disaster. Here, an object is to make chafe sleeves from high temperature plastic materials which exhibit ablative properties and become stronger in the presence of fire, and which tends to be refractive and to self-extinguish when burned.

Yet another object is to provide chafe sleeves, for hoses, which remain flexible and do not make the hose become stiff and rigid. Here, an object is to provide hoses which may be fished through internal aircraft structural members.

In keeping with an aspect of the invention, those and other objects are accomplished by a chafe sleeve made from urethane/silicone materials in the range of 80% to 20% urethane and 20% to 80% silicone. These materials can be mixed and copolymerized to give good abrasion resistance and excellent fuel and oil resistance, at temperatures over at least the entire range from −65° F. to 400° F. The chafe guard material is formed into an integral pair of layers which are bonded directly onto the hose, with a color code layer to show when chafing has occurred. The mixture consists of a flexible elastomer of high abrasion resistance and with a very wide range of fluid compatibility.

Various forms of the invention may be understood from the attached drawings wherein:

FIG. 2 is a table which gives a series of representative compositions of the inventive material;

FIG. 3 is a table which gives the variation in physical properties of the inventive material;

Figure 1:
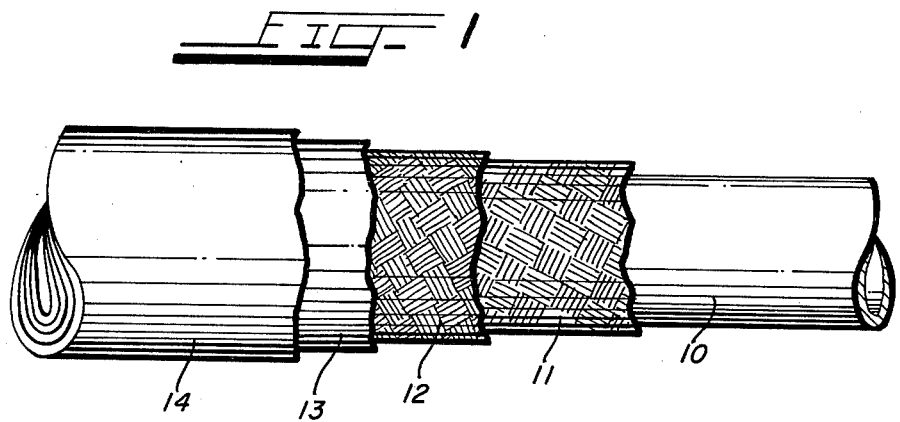
FIG. 1 is a perspective view of the inventive chafe sleeve used on an exemplary hose, here shown as one having an elastic inner tube member covered by two layers of braid.

The inventive chafe sleeve is shown on an exemplary hose (FIG. 1) which may include an internal elastic tube made of a flexible, elastomeric material 10, a reinforcing braid 11, an electrically conductive braid 12, and the inventive outer chafe sleeve 13, 14. Of course, the total hose structure may vary significantly, depending upon the anticipated uses of the hose. For example, if electrical grounding is not important, the electrically conductive braid 12 may be omitted. Or, if mechanical reinforcing strength is not required, the braid 11 may be omitted. If either or both of these braided layers are omitted, the chafe sleeve 13, 14 is applied directly over the remaining elastomeric hose 10.

The outer layer 14 of the chafe sleeve is made from a mixture of urethane and silicone, and suitable additives which may be cured to form a copolymer. The inner layer 13 of the chafe sleeve is preferably made from pure silicone. FIG. 2 sets forth the composition of five different working examples of materials which may be used to make the chafe sleeve. Neglecting the additives: the first example includes 100% urethane; the second example includes 7% urethane and 30% silicone; the third example includes 50% urethane and 50% silicone; the fourth example includes 35% urethane and 65% silicone; and the fifth example is 100% silicone. Either or both sleeves 13, 14 may be used on the hose. The chafe sleeve is bonded directly onto the wire braid when it is used. The fire sleeve is extruded around the hose when it is used.

FIG. 2 makes reference to urethane-elastothane 640 and to silicone General Electric SE 456. Urethane-elastothane 640 is a millable vulcanizable polyester gum urethane, produced by the Thiokol Company, and has the following properties:

| Chemical type | Polyester urethane |
|---|---|
| Physical form | Solid |
| Color | Light amber |
| Specific gravity | 1.15 |
| Mooney viscosity [ML 1 + 3 212° F. (100° C.)] | 25–50 |

| PROPERTY | SULFUR CURE | PEROXIDE CURE |
|---|---|---|
| Tensile strength, psi (Kg/cm$^2$) | 5530 (390) | 4880 (343) |
| Elongation, % | 490 | 320 |
| 200% modulus, psi (Kg/cm$^2$) | 1630 (115) | 2200 (155) |
| Hardness, Shore A | 77 | 72 |
| Tear (Die C) pli (Kg/cm) | 340 (60.7) | 250 (44.6) |
| Compression set, % 22 hrs. at 158° F. (70° C.) | | |
| Low temperature, torsional ° F. (° C.) (ASTM D-1043) | −6 (−23) | −14 (−29) |

Silicone General Electric SE 456 is a methyl-vinyl-silicone elastomer which is capable of compounding with other materials. The manufacturer states that this material has the following properties:

| CURING AGENT | SE-456U | |
|---|---|---|
| Bis(2,4 DiChlorobenzoyl) Peroxide 50% Active | 1.2 | |
| 2,5 DiMethyl-2,5 Di (t-Butyl Peroxy) Hexane 50% Active | | 1.0 |
| Press Cure Conditions | 10 Min at 250° F. | 10 Min at 350° F. |
| Post Cure Conditions | 4 hrs at 400° F. | 4 hrs at 400° F. |
| TYPICAL PROPERTIES | | |
| Durometer, Shore "A" | 50 ± 5 | 50 ± 5 |
| Tensile Strength (psi) | 1300 | 1350 |
| Elongation (%) | 550 | 700 |
| Tear Resistance (#/in) | 200 | 200 |
| Compression Set (%) | | |
| 70 hrs at 212° F. | 16 | 17 |
| 70 hrs at 300° F. | 30 | 31 |
| 22 hrs at 350° F. | 30 | 32 |
| Tensile Stress Modulus | | |
| at 100% Elongation (psi) | 215 | 220 |
| at 200% Elongation (psi) | 485 | 375 |
| at 400% Elongation (psi) | 855 | 735 |
| Bashore Resiliency | 50 | 50 |
| Brittle Point ° F. | −130 | −130 |
| % Linear Shrinkage | 3.0 | 4.0 |
| Tear Propagation Resistance Flex Cycles at 75° F. | >150,000 | >150,000 |

The aforesaid specific urethane and silicone material compositions are indicative of the general types of urethane and silicone materials usable in the inventive compositions.

FIG. 3 sets forth, in detail, the test results for each of the aformentioned five examples. These test results are apparent from a study of the figure. Therefore, it is thought that those who are skilled in the art may identify the particular materials which best meet their individual needs by a comparison and contrast of the various figures. Moreover, after a study of these figures, it is obvious from the data that the properties of the material are improved significantly within the composition mixture range of 80% to 20% urethane and 20% to 80% silicone.

Other benefits which are not immediately apparent in the chart of FIG. 3 are that the fire resistance and self-extinguishing properties of urethane are enhanced even when concentrations of urethane are as high as 80%. If there is 100% urethane, it burns and melts as a thermoplastic when subjected to a torch. The composite mixture of urethane and silicone does not melt when there is at least 20% silicone. Rather, it forms a refractory type ash which resists deterioration in fire. As higher levels of silicone are added, the refractory structure becomes stronger and the self-extinguishing characteristics are enhanced.

Flame retardants can be introduced as fillers to further enhance the self-extinguishing characteristic of the material. However, these fillers tend to cause the chafe sleeve material to lose its flexibility at very cold temperatures. At temperatures of −65° F. and lower, the fillers can cause the material to split when it is flexed, as when the hose bends around a minimum radius set forth in standard hose specifications.

In order to provide a maximum chafe resistance, the inventive chafe sleeve material should be bonded directly to the hose body. Urethane alone gives a poor bond, especially if the metallic braid 12 is used on the hose. However, silicone does bond well to the braid, and the urethane/silicone composition bonds well to the silicone.

According to the invention, the bonding is best when the chafe sleeve is made from a pair of coaxial layers 13, 14. Pure silicone is used in the inside layer 13 and is bonded directly to the metal braid 12. Preferably, this inner layer 13 is colored red, or another convenient color. The outside layer, chafe resistant sleeve 14 is black or another contrasting colored layer, and is made of a urethane/silicone copolymer mixture which is bonded onto the inside red silicone layer 13. The red layer 13 of silicone serves as a signal that chafing has occurred (i.e., when the chafe sleeve layer 14 has worn through, the red color of the under layer 13 shows through and contrasts with the outer layer 14).

Figure 4:
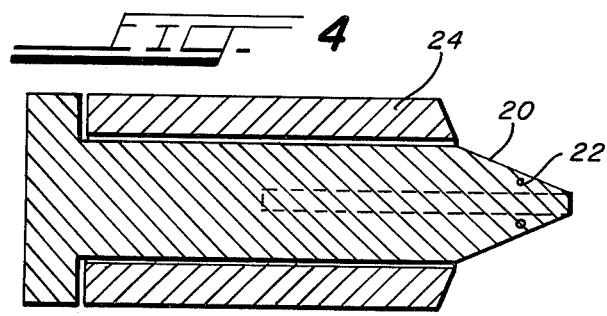
FIG. 4 is a cross-sectional view of a peel back tool used to apply end fittings to the inventive hose.

FIG. 4 shows a tool which is used to attach a fitting to the inventive hose. The tool includes a central mandrel or peel back tube 20, having a tapered and conical end with air holes 22 formed around the periphery thereof. A sliding sleeve is positioned to slide back and forth on the peel back tool 20.

In order to make a completed hose, the jacketed hose of one embodiment is first cut to a desired length. Then, one end of the inner tube 10 is fitted over the tapered point of the peel back tool 20. Air is expelled through the air holes 22 to form a thin friction-free air bearing surface between the hose and the tool. The hose is then pushed onto the peel back tube until it engages the sliding sleeve 24. Next, the sleeve 24 is moved toward the tube which forces the jacket 13 to double-back upon itself. Eventually, the sleeve 24 doubles back a predetermined and desired amount of the braid leaving a short section of braided hose exposed.

Figure 5:
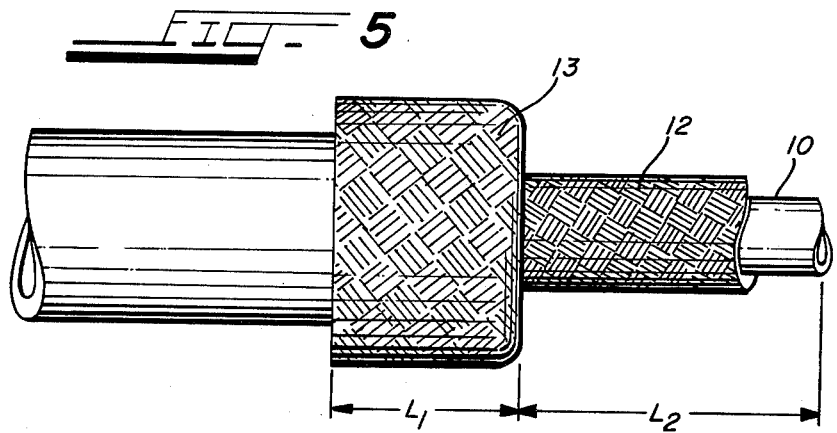
FIG. 5 is a side elevation view of one embodiment of the hose which may be peeled back so that a fitting may be attached thereto.

The peel back tool 20 is removed from the hose leaving it as shown in FIG. 5, wherein the braid layer 13 has been separated from the layer 12 and doubled back for a distance L1, leaving a nondoubled back length L2 of reduced diameter onto which a fitting may be slipped and bonded. As seen in FIG. 5, the two braided layers 12, 13 have a mutually reversed braid pattern, which provides a greater number of bondable interstices. Without these added number of interstices, a bonding material might be extruded when the braid is returned to its original configuration.

The fitting is next slipped onto the braid 12 with a suitable bonding material therebetween. Then, the doubled back portion L1 is rolled back into its original position, and over the fitting, with a suitable bonding material therebetween. Hence, the fitting is bonded onto the end of the hose. Also, the metallic braid 13 may be cemented in place with a conductive bond on the fitting.

In reference to the embodiment which may be peeled back, as seen in FIG. 5, the foregoing description has referred to a combined chafe sleeve with an extruded fire sleeve. These are not necessarily used on the same products. The chafe sleeve must be bonded to the wire braid if it is to be fully effective. When it is properly bonded, it cannot be peeled back as shown in FIG. 5. The peel back technique is primarily used for fire sleeves.

The advantages of the invention should now be apparent. In addition to being a good chafe guard, with a wide range of service temperature and a wide range of chemical compatibility, this composite material also provides good fire protection. Its fire insulating quality is obtained from the refractory ash that forms when the chafe sleeve on the hose is subjected to a high temperature. When covered with oil, silicone alone loses its physical properties, and could fall apart if subjected to vibration and fire simultaneously (as may occur aboard an aircraft, for example). Urethane alone burns and melts unless augmented with fire retardants or fillers that inhibit flexibility and reduce the range of service temperatures. However, when mixed, the copolymer formed by both materials provides good resistance to the fuel before a fire starts and excellent protection for the hose after a fire starts.

Those who are skilled in the art will readily perceive how the inventive material may be used or modified. Therefore, the appended claims should be construed broadly to cover all equivalent materials and structures which fall within the true scope and spirit of the invention.

We claim:

1. A chafe or fire sleeve for an aircraft fuel hose comprising an internal tube with an outer sleeve integrally formed thereon, said sleeve having a pair of coaxial layers, an outer of said coaxial layers being the chafe or fire sleeve made from a mixture of urethane and silicone elastomers, said urethane and silicone in said outer layer being mixed, with their proportions being in the range of 80% to 20% urethane and 20% to 80% silicone, respectively, and an inner of said coaxial layers being silicone.

2. The chafe or fire sleeve of claim 1 wherein the proportions of said urethane and silicone are respectively approximately 70%/30%, and the cure time and temperature are five minutes at 350° F.

3. The chafe or fire sleeve of claim 1 wherein the sleeve is extruded onto said hose.

4. The chafe or fire sleeve of claim 2 wherein the composition of said outer layer is:

| Material | Composition |
| --- | --- |
| Urethane | 53% |
| Silicone | 23% |
| Silica | 5% |
| Treated Clay | 8% |
| Dessicant | 2% |
| Leveler | 2% |
| Plasticizer | 2% |
| Catalyst | 1% |
| Pigment | 3% |
| Minor Ingredients | 1% |
| | 100% |

5. The chafe or fire sleeve of claim 1 wherein said urethane and silicone are respectively approximately 50%/50%, and the cure time and temperature are five minutes at 350° F.

6. The chafe or fire sleeve of claim 5 wherein the composition of the outer layer is :

| Material | Composition |
| --- | --- |
| Urethane | 38% |
| Silicone | 38% |
| Silica | 5% |
| Treated Clay | 7% |
| Dessicant | 2% |
| Leveler | 2% |
| Plasticizer | 2% |
| Catalyst | 2% |
| Pigment | 3% |
| Minor Ingredients | 1% |
| | 100% |

7. The chafe or fire sleeve of claim 1 wherein said urethane and silicone are respectively approximately 35%/65%, and the cure time and temperature are ten minutes at 325° F.

8. The chafe or fire sleeve of claim 7 wherein the composition of said outer layer is:

| Material | Composition |
| --- | --- |
| Urethane | 28% |
| Silicone | 52% |
| Silica | 3% |
| Treated Clay | 4% |
| CoAgent | 1% |
| Dessicant | 2.5% |
| Leveler | 2.5% |
| Plasticizer | 2% |
| Catalyst | 1% |
| Pigment | 3% |
| Minor Ingredients | 1% |
| | 100% |

9. The chafe or fire sleeve of claim 1 and a hose structure comprising an inner tube made of an elastomeric material covered with braid, said inner layer of silicone being bonded directly onto said braid.

10. The chafe or fire sleeve of claim 9 wherein said braid includes at least some metallic material.

11. The chafe or fire sleeve of claim 1 wherein said outer layer of urethane and silicone mixture is one color and said inner layer of silicone is another color, whereby a chafing of the outer layer of said sleeve is indicated by the color of an inner layer being exposed through the color of the outer layer.

12. A hose comprising an inner tube structure covered by a chafe or fire sleeve coaxially formed thereon, said chafe or fire sleeve being a coaxial member comprising an outer layer of urethane and silicone elastomers mixed in the range of, respectively, 80%/20% to 20%/80%, and the inner member being a layer of silicone formed between said inner tube and said outer layer.

13. The hose of claim 12 wherein said inner tube structure includes an elastomeric hose covered by a braid, and said coaxial member comprises an inner layer of silicone bonded to said braid.

14. The hose of claim 13 wherein said braid includes a layer of metallic material.

15. The hose of claim 13 wherein said braid includes a layer of reinforcing material.

16. The hose of claim 12 wherein said sleeve is extruded onto said inner tube.

* * * * *

UNITED STATES PATENT AND TRADEMARK OFFICE
CERTIFICATE OF CORRECTION

PATENT NO. : 4,190,088
DATED : February 26, 1980
INVENTOR(S) : JAMES M. LALIKOS ET AL.

It is certified that error appears in the above-identified patent and that said Letters Patent are hereby corrected as shown below:

Column 1, line 15, should read --to refer to the outer covering as a "chafe sleeve", a "fire sleeve", or a "chafe or fire sleeve".--

The following language has been omitted: "a 'chafe sleeve', a 'fire sleeve', or".

Column 2, line 6, "sleeve" should read --sleeves--;
line 68, "7%" should read --70%--.

Column 3, line 28, in the table entitled "PROPERTY", for "Compression set, %", insert --16-- under "SULFUR CURE", and --7-- under "PEROXIDE CURE".

Signed and Sealed this

Twenty-seventh Day of May 1980

[SEAL]

Attest:

SIDNEY A. DIAMOND

Attesting Officer
Commissioner of Patents and Trademarks